(12) United States Patent
Sato et al.

(10) Patent No.: US 11,479,317 B2
(45) Date of Patent: Oct. 25, 2022

(54) STRADDLE RIDE ELECTRIC VEHICLE

(71) Applicant: HONDA MOTOR CO., LTD., Tokyo (JP)

(72) Inventors: Akira Sato, Tokyo (JP); Sadataka Okabe, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/606,913

(22) PCT Filed: Jul. 10, 2019

(86) PCT No.: PCT/JP2019/027411
§ 371 (c)(1),
(2) Date: Oct. 27, 2021

(87) PCT Pub. No.: WO2021/005765
PCT Pub. Date: Jan. 14, 2021

(65) Prior Publication Data
US 2022/0144367 A1 May 12, 2022

(51) Int. Cl.
*B62J 43/16* (2020.01)
*B62J 43/28* (2020.01)
(Continued)

(52) U.S. Cl.
CPC ............... *B62J 43/16* (2020.02); *B62J 43/28* (2020.02); *H01M 50/209* (2021.01); *H01M 50/249* (2021.01); *H01M 2220/20* (2013.01)

(58) Field of Classification Search
CPC ............ B62J 43/16; B62J 43/28; B62J 43/20; H01M 50/209; H01M 50/249; H01M 2220/20
See application file for complete search history.

(56) References Cited

U.S. PATENT DOCUMENTS 6,624,610 B1 * 9/2003 Ono .................. B62J 43/16
320/104
9,027,692 B2 5/2015 Nakashima et al.
(Continued)

FOREIGN PATENT DOCUMENTS

CN 101989667 A 3/2011
CN 204137289 U 2/2015
(Continued)

OTHER PUBLICATIONS

Office Action dated Nov. 16, 2021 issued over the corresponding Indian Patent Application No. 202117040337.
(Continued)

*Primary Examiner* — Michael L Dignan
(74) *Attorney, Agent, or Firm* — Carrier Backman and Associates, P.C.; William D. Blackman; Joseph P. Carrier

(57) ABSTRACT

A straddle-type electric vehicle includes two approximately rectangular parallelepiped batteries, a battery case in which the batteries are housed, battery-side terminals provided on bottom surfaces of the batteries, and case-side terminals engaged with the battery-side terminals. The two batteries are arranged next to each other in a vehicle width direction. An operation lever for connecting or separating the battery-side terminals and the case-side terminals to/from each other is provided. The operation lever is arranged in a middle in the vehicle width direction between the two batteries, and the battery-side terminals and the case-side terminals are arranged nearer outer sides in the vehicle width direction. A pair of front and rear link mechanisms for coupling the operation lever and the case-side terminals to each other is provided in front of and behind the battery case.

20 Claims, 14 Drawing Sheets

(51) Int. Cl.
  *H01M 50/249*   (2021.01)
  *H01M 50/209*   (2021.01)

(56) References Cited

U.S. PATENT DOCUMENTS

| | | | |
|---|---|---|---|
| 2004/0031632 A1* | 2/2004 | Kohda | B60L 53/80 |
| | | | 180/68.5 |
| 2012/0145852 A1 | 6/2012 | Chiang | |
| 2012/0247856 A1* | 10/2012 | Shinde | B60K 1/04 |
| | | | 180/216 |
| 2013/0161108 A1* | 6/2013 | Watanabe | B62J 43/16 |
| | | | 180/220 |
| 2016/0280306 A1* | 9/2016 | Miyashiro | B62K 11/04 |
| 2019/0241231 A1* | 8/2019 | Cheng | B62K 19/30 |

FOREIGN PATENT DOCUMENTS

| | | | | |
|---|---|---|---|---|
| EP | 0 794 113 A2 | | 9/1997 | |
| EP | 263404 | * | 8/2001 | ............... B62J 9/00 |
| EP | 2 280 436 A2 | | 2/2011 | |
| EP | 2 623 404 A1 | | 8/2013 | |
| EP | 3 266 693 A1 | | 1/2018 | |
| JP | 2002-029488 A | | 1/2002 | |
| JP | 2008-228507 A | | 9/2008 | |
| JP | 2011-049151 A | | 3/2011 | |
| JP | 2013-129348 A | | 7/2013 | |
| JP | 5513628 B2 | | 6/2014 | |
| TW | 201925021 A | | 7/2019 | |
| WO | 2012/043518 A1 | | 4/2012 | |
| WO | 2016/139693 A1 | | 9/2016 | |

OTHER PUBLICATIONS

Office Action issued in corresponding JP Patent Application No. 2020-554564 with the English translation thereof.
Office Action issued in the corresponding Taiwanese Patent Application.
PCT/ISA/210 from International Application PCT/JP2019/027411 with the English translation thereof.
Extended European search report dated Mar. 7, 2022 over the corresponding European Patent Application No. 19937159.2.

* cited by examiner

STRADDLE RIDE ELECTRIC VEHICLE

TECHNICAL FIELD

The present invention relates to a straddle-type electric vehicle, and more particularly to a straddle-type electric vehicle in which a portable battery for supplying electric power to a motor as a drive source is detachably housed in a vehicle body.

BACKGROUND ART

In the past, a straddle-type electric vehicle in which portable batteries for supplying electric power to a motor is detachably housed in a vehicle body has been known.

Patent Literature 1 discloses a configuration in which two portable batteries each formed in an approximately rectangular parallelepiped shape are housed in a housing case provided below an opening/closing seat in a scooter-type electric-powered motorcycle in which a low floor is provided between a steering handlebar and the seat.

CITATION LIST

Patent Literature

Patent Literature 1: WO 2012/043518 A

Problem to be Solved by Invention

Here, in a straddle-type electric vehicle having a large loading platform instead of a rear seat, it is conceivable that two portable batteries are arranged next to each other in the vehicle width direction in order to secure the area of the loading platform. Although such arrangement itself has been proposed even in Patent Literature 1, there has been still room for devising in terms of a concrete configuration in which all of securing a sufficient battery capacity, ease of an attaching/detaching operation of the batteries, downsizing the vehicle body, and the like can be achieved.

The object of the present invention is to solve the problem of the prior art and to provide a straddle-type electric vehicle capable of enhancing convenience by optimizing an arrangement and housing structure of portable batteries.

Solution to Problem

In order to achieve the above-described object, the present invention has a first feature in that a straddle-type electric vehicle (1) is configured by including two approximately rectangular parallelepiped batteries (B), a battery case (33) in which the batteries (B) are housed, battery-side terminals (49) provided on bottom surfaces of the batteries (B), and case-side terminals (55) engaged with the battery-side terminals (49), wherein the two batteries (B) are arranged next to each other in a vehicle width direction, an operation lever (36) for moving the case-side terminals (55) up and down to connect or separate the battery-side terminals (49) and the case-side terminals (55) to/from each other is provided, the operation lever (36) is arranged at a position in a middle in the vehicle width direction between the two batteries (B), and the battery-side terminals (49) and the case-side terminals (55) are positioned nearer outer sides in the vehicle width direction.

In addition, the present invention has a second feature in that a pair of front and rear link mechanisms (L) for coupling the operation lever (36) and the case-side terminals (55) to each other is provided in front of and behind the battery case (33).

In addition, the present invention has a third feature in that the link mechanisms (L) have a bilaterally symmetrical structure centered on the middle in the vehicle width direction as a center.

In addition, the present invention has a fourth feature in that the link mechanisms (L) include arm members (72) for connecting first axes (36g) that are connected to the operation lever (36) to act as force points to second axes (71) that function as working points connected to the case-side terminals (55), and each of third axes (73) that is provided at each of the arm members (72) to act as a fulcrum is provided nearer the second axis (71) than a middle of each arm member (72).

In addition, the present invention has a fifth feature in that the straddle-type electric vehicle (1) is a scooter-type vehicle having a low floor (17) between a steering handlebar (2) and a seat (29), the battery case (33) is arranged between a pair of left and right rising frames (F4) coupled to rear ends of underframes (F3) for supporting the low floor (17) from below, and a cross pipe (F5) that is formed in a curved shape projecting toward an upper side of a vehicle body to couple the pair of left and right rising frames (F4) to each other is arranged in front of the link mechanisms (L).

In addition, the present invention has a sixth feature in that a contactor (46) for turning on and off electric power supply to electric components is provided, and the contactor (46) is arranged in front of the battery case (33) and behind the cross pipe (F5).

In addition, the present invention has a seventh feature in that a pair of front and rear separator parts (36c) is provided at the operation lever (36), and, when the operation lever (36) is pushed down to a position where the battery-side terminals (49) and the case-side terminals (55) are connected to each other, the separator parts (36c) are accommodated between the two batteries (B) at a position nearer front ends and a position nearer rear ends of the batteries (B).

In addition, the present invention has an eighth feature in that a partition (54) positioned between the two batteries (B) is provided at a position nearer a bottom portion of the battery case (33).

In addition, the present invention has a ninth feature in that the case-side terminals (55) are arranged while projecting below bottom portions of the battery case (33).

In addition, the present invention has a tenth feature in that a down regulator (57) is arranged between the left and right case-side terminals (55) below a bottom portion of the battery case (33).

In addition, the present invention has an eleventh feature in that each battery (B) is formed in an approximately rectangular parallelepiped shape that is long in an up-and-down direction of the vehicle body, and surfaces directed outward in the vehicle width direction among six surfaces constituting each battery (B) are formed in a curved shape projecting outward in the vehicle width direction in a vehicle body plan view.

Advantageous Effects of Invention

According to the first feature, the straddle-type electric vehicle (1) is configured by including the two approximately rectangular parallelepiped batteries (B), the battery case (33) in which the batteries (B) are housed, the battery-side terminals (49) provided on the bottom surfaces of the batteries (B), and the case-side terminals (55) engaged with the battery-side terminals (49), wherein the two batteries (B) are arranged next to each other in the vehicle width direction, the operation lever (36) for moving the case-side terminals (55) up and down to connect or separate the battery-side terminals (49) and the case-side terminals (55) to/from each other is provided, the operation lever (36) is arranged at a position in the middle in the vehicle width direction between the two batteries (B), and the battery-side terminals (49) and the case-side terminals (55) are positioned nearer outer sides in the vehicle width direction. Thus, the operation lever for connecting or separating the battery-side terminals and the case-side terminals to/from each other can be similarly operated from either the left or right side of the vehicle body, and replacement work of the batteries is facilitated. In addition, a space for providing the mechanisms interlocking the operation lever and the case-side terminals can be secured by arranging the operation lever and the case-side terminals while being apart from each other. In addition, the distance between the mechanisms interlocking the operation lever and the case-side terminals can be made longer, and the operation load of the operation lever can be reduced.

According to the second feature, the pair of front and rear link mechanisms (L) for coupling the operation lever (36) and the case-side terminals (55) to each other is provided in front of and behind the battery case (33). Thus, the case-side terminals can be stably moved up and down by the pair of front and rear link mechanisms. In addition, by arranging the link mechanisms in front of and behind the battery case, the dimension around the battery case in the vehicle width direction can be reduced, and the link mechanisms can be protected even when external force is applied from the side of the vehicle body.

According to the third feature, the link mechanisms (L) have a bilaterally symmetrical structure centered on the middle in the vehicle width direction. Thus, the operations of the left and right case-side terminals can be synchronized, and the terminals can be excellently moved up and down by one operation lever.

According to the fourth feature, the link mechanisms (L) include the arm members (72) for connecting the first axes (36g) that are connected to the operation lever (36) to act as force points to the second axes (71) that function as working points connected to the case-side terminals (55), and each of the third axes (73) that is provided at each of the arm members (72) to act as a fulcrum is provided nearer the second axis (71) than the middle of each arm member (72). Thus, the lever ratio of the link mechanisms can be increased to reduce the operation load of the operation lever.

According to the fifth feature, the straddle-type electric vehicle (1) is a scooter-type vehicle having the low floor (17) between the steering handlebar (2) and a seat (29), the battery case (33) is arranged between the pair of left and right rising frames (F4) coupled to rear ends of the underframes (F3) for supporting the low floor (17) from below, and the cross pipe (F5) that is formed in a curved shape projecting toward the upper side of the vehicle body to couple the pair of left and right rising frames (F4) to each other is arranged in front of the link mechanisms (L). Thus, the link mechanisms can be protected even when external force is applied from the front side.

According to the sixth feature, the contactor (46) for turning on and off electric power supply to the electric components is provided, and the contactor (46) is arranged in front of the battery case (33) and behind the cross pipe (F5). Thus, the contactor can be protected by the cross pipe even when external force is applied from the front side of the vehicle body. In addition, a harness for connecting the batteries and the contactor to each other can be shortened by disposing the contactor at a position near the batteries.

According to the seventh feature, the pair of front and rear separator parts (36c) is provided at the operation lever (36), and, when the operation lever (36) is pushed down up the position where the battery-side terminals (49) and the case-side terminals (55) are connected to each other, the separator parts (36c) are accommodated between the two batteries (B) at a position nearer front ends and a position nearer rear ends of the batteries (B). Thus, the operation lever can also function as a partition plate for stably holding the two batteries at predetermined positions while preventing the two batteries disposed close to each other from coming into contact with each other.

According to the eighth feature, the partition (54) positioned between the two batteries (B) is provided at a position nearer a bottom portion of the battery case (33). Thus, by providing the partition, it is possible to stably hold the two batteries and to prevent the two batteries housed in the battery case from coming into contact with each other on the bottom side. In addition, insertion work of the batteries is facilitated by allowing the partition to function as a guide when the batteries are inserted into the battery case.

According to the ninth feature, the case-side terminals (55) are arranged while projecting below bottom portions of the battery case (33). Thus, the vertical dimension of the battery case can be reduced, and a space for arranging other components can be provided between the left and right case-side terminals.

According to the tenth feature, the down regulator (57) is arranged between the left and right case-side terminals (55) below a bottom portion of the battery case (33). Thus, by arranging the down regulator using a space between the left and right case-side terminals, the layout efficiency can be enhanced, and a harness connected to the down regulator can be shortened. In addition, the down regulator can be efficiently cooled by a traveling wind passing below the battery case.

According to the eleventh feature, each battery (B) is formed in an approximately rectangular parallelepiped shape that is long in the up-and-down direction of the vehicle body, and surfaces directed outward in the vehicle width direction among six surfaces constituting each battery (B) are formed in a curved shape projecting outward in the vehicle width direction in a vehicle body plan view. Thus, while maximizing the battery capacity, an insertion work can be facilitated by easily grasping the batteries in an insertion direction. In addition, since the surface brought into contact with an upper end of the battery case when each battery is attached and detached is curved, frictional resistance when the weight of each battery is put on the upper end of the battery case is small, and smooth attaching/detaching work can be performed.

DESCRIPTION OF EMBODIMENT

Figure 1:
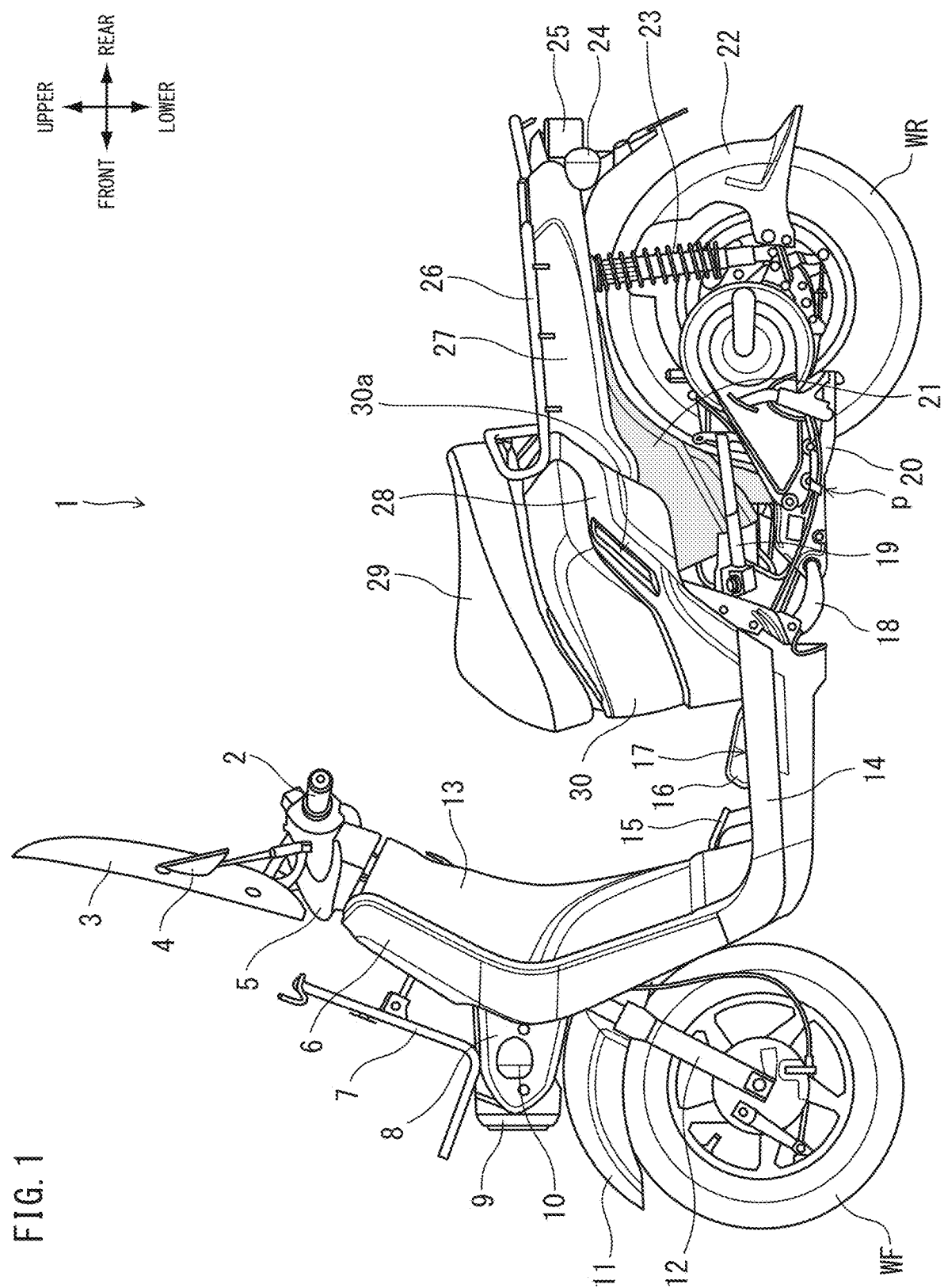
FIG. 1 is a left side view of an electric-powered motorcycle according to an embodiment of the present invention.
Figure 2:
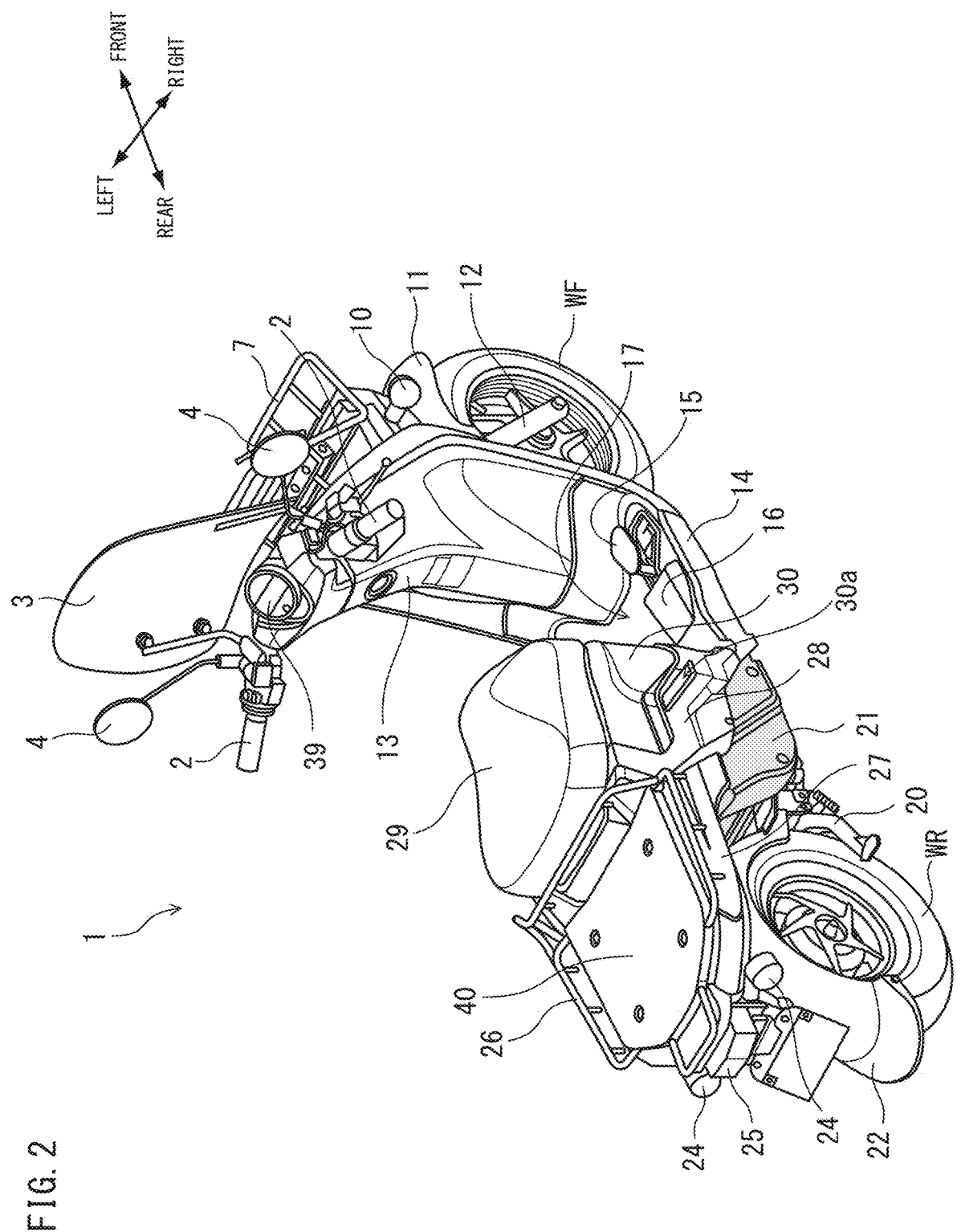
FIG. 2 is a perspective view of the electric-powered motorcycle viewed from a right rear.

Hereinafter, a preferred embodiment of the present invention will be described in detail with reference to the drawings. FIG. 1 is a left side view of an electric-powered motorcycle 1 according to an embodiment of the present invention. In addition, FIG. 2 is a perspective view of the electric-powered motorcycle 1 viewed from a right rear. The electric-powered motorcycle 1 is what is generally called a scooter-type straddle-type electric vehicle in which a low floor 17 for putting the feet of an occupant is provided between a steering handlebar 2 and a seat 29.

A pair of left and right front forks 12 for pivotally supporting a front wheel WF to be rotatable is swingable by the steering handlebar 2 extended in a vehicle width direction. In a handle cover 5 covering the front and rear of the steering handlebar 2, a meter device 39 is buried, and a windbreak screen 3 and a pair of left and right rearview mirrors 4 are attached. A front cover 6 on a front side of a vehicle body and a floor panel 13 facing the legs of the occupant on a rear side of the vehicle body of the front cover 6 are arranged below the handle cover 5. A front carrier 7 is supported in front of the front cover 6, and a headlight 9 and a pair of left and right front-side flasher lamps 10, which are supported by a light stay 8, are arranged therebelow. A front fender 11 covering above the front wheel WF is supported by the left and right front forks 12.

A brake pedal 15 for actuating a brake device of a rear wheel WR and a foot rest 16 for enhancing the operability of the brake pedal 15 are arranged on an upper surface of the low floor 17. A pair of left and right undercovers 14 covering the low floor 17 from below is coupled to left and right ends of the low floor 17. A seat lower cover 30 having a curved shape projecting on the front side of the vehicle body is arranged below the seat 29 on which a driver sits. A floor upper cover 28 continued to an upper portion of the low floor 17 is coupled to a lower portion of the seat lower cover 30.

A side stand 19 is arranged on the rear side of the vehicle body of the undercover 14 on the left side in the vehicle width direction. A pair of left and right rear covers 27 is arranged behind the floor upper cover 28, and a rear carrier 40 surrounded by a grip pipe 26 is arranged at upper portions of the rear covers 27. A taillight device 25 and a pair of left and right rear-side flasher lamps 24 are arranged behind the rear covers 27.

A swing unit type power unit P for pivotally supporting the rear wheel WR to be rotatable is arranged behind the undercovers 14. The power unit P incorporating a motor for driving the rear wheel WR is swingably attached to a vehicle body frame through a link lever 18. A rear portion of the power unit P is suspended from the vehicle body frame by a rear cushion 23. A rear fender 22 covering an upper rear of the rear wheel WR is attached to an upper portion of the power unit P, and a center stand 20 is attached to a lower portion of the power unit P.

A cover member 21 (a gray colored part illustrated in the drawing) for receiving a traveling wind introduced from a slit 30a of the floor upper cover 28 and a traveling wind flowing inside the undercovers 14 is arranged at a position between the seat lower cover 30 and the rear fender 22.

Figure 3:
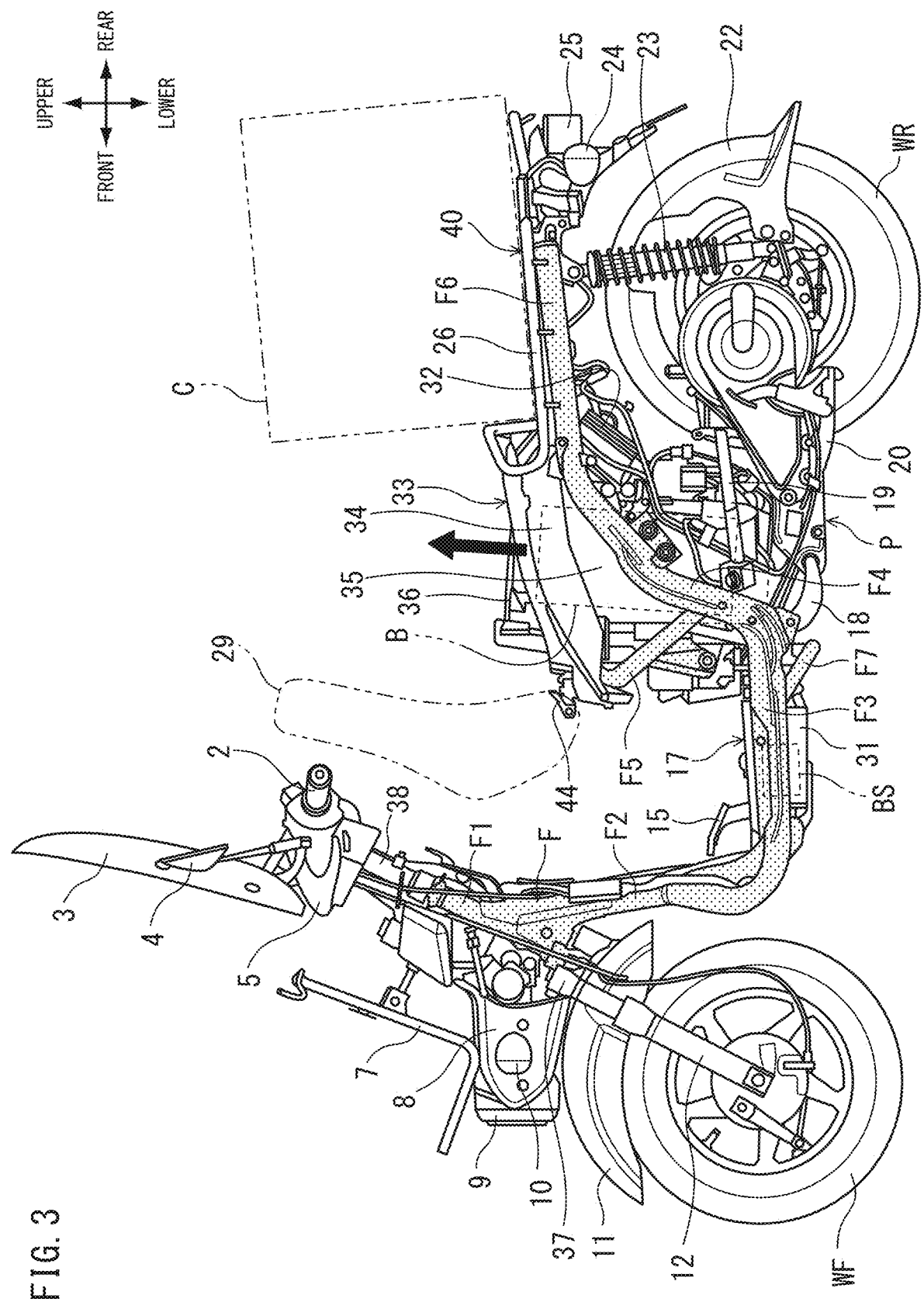
FIG. 3 is a left side view of the electric-powered motorcycle in a state where main exterior parts are removed.

FIG. 3 is a left side view of the electric-powered motorcycle 1 in a state where main exterior parts are removed. A vehicle body frame F (a stippled hatching part illustrated in the drawing) of the electric-powered motorcycle 1 includes a main frame F2 in a middle in the vehicle width direction extending downward from a head pipe F1, a pair of left and right underframes F3 coupled to a lower end of the main frame F2 and curved rearward, rising frames F4 directed upward and rearward from rear ends of the underframes F3, and a pair of left and right rear frames F6 continued to the rising frames F4 and extending rearward. A cross pipe F5 for coupling the left and right rising frames F4 to each other is coupled to front portions of the rising frames F4.

A steering stem 38 is pivotally supported to be rotatable by the head pipe F1. The steering handlebar 2 is fixed to an upper end of the steering stem 38, and a bottom bridge 37 for supporting upper ends of the front forks 12 is fixed to a lower end of the steering stem 38. A battery case 33 for housing two portable batteries B, which supply electric power to the motor, next to each other in the vehicle width direction is arranged below the seat 29. The battery case 33 includes a vertically long lower-side case 35 matching the shapes of the batteries B and an upper-side case 34 coupled to an upper portion of the lower-side case 35 and forming an opening matching the bottom shape of the seat 29. The seat 29 is pivotally supported to be openable and closable by a hinge 44 positioned at an upper portion of a front end of the battery case 33, and functions as an opening and closing cover of the battery case 33. In the drawing, the seat 29 in an open state is illustrated by a two-dotted chain line.

The battery case 33 is housed between the pair of left and right rising frames F4 behind the cross pipe F5. The seat lower cover 30 (see FIGS. 1 and 2) extends from the front of the cross pipe F5 up to the sides of the left and right rising frames F4 so as to cover the front and sides of the battery case 33. A housing case 31 for housing electric components such as a low-voltage sub-battery BS, which supplies electric power to auxiliaries such as the headlight 9, and a fuse is arranged below the low floor 17. A coupling pipe F7 for coupling the left and right underframes F3 to each other to enhance rigidity and protecting the housing case 31 is arranged at lower portions of the underframes F3.

The cover member 21 (see FIGS. 1 and 2) for receiving a traveling wind from the front of the vehicle body in front of the rear fender 22 is arranged on the rear surface side of the battery case 33, and a PCU (power control unit) 32 for controlling electric power supply to the motor is arranged at a position covered with the cover member 21 near the upper side on the rear surface side of the battery case 33.

Each battery B is formed in an approximately rectangular parallelepiped shape that is long in the up-and-down direction and is housed in the battery case 33 in a state of being inclined slightly rearward with respect to the vertical direction. Accordingly, the height dimension of the battery case 33 is suppressed, and the position of the center of gravity is lowered to facilitate attaching/detaching work of the batteries B. In addition, by inclining the batteries B, the pull-out direction (an arrow illustrated in the drawing) when the batteries B are taken out from the battery case 33 is also inclined slightly rearward, but the inclination angle is in a range where the batteries B do not interfere with baggage C even in a state where the large baggage C is loaded on the rear carrier 40.

Figure 4:
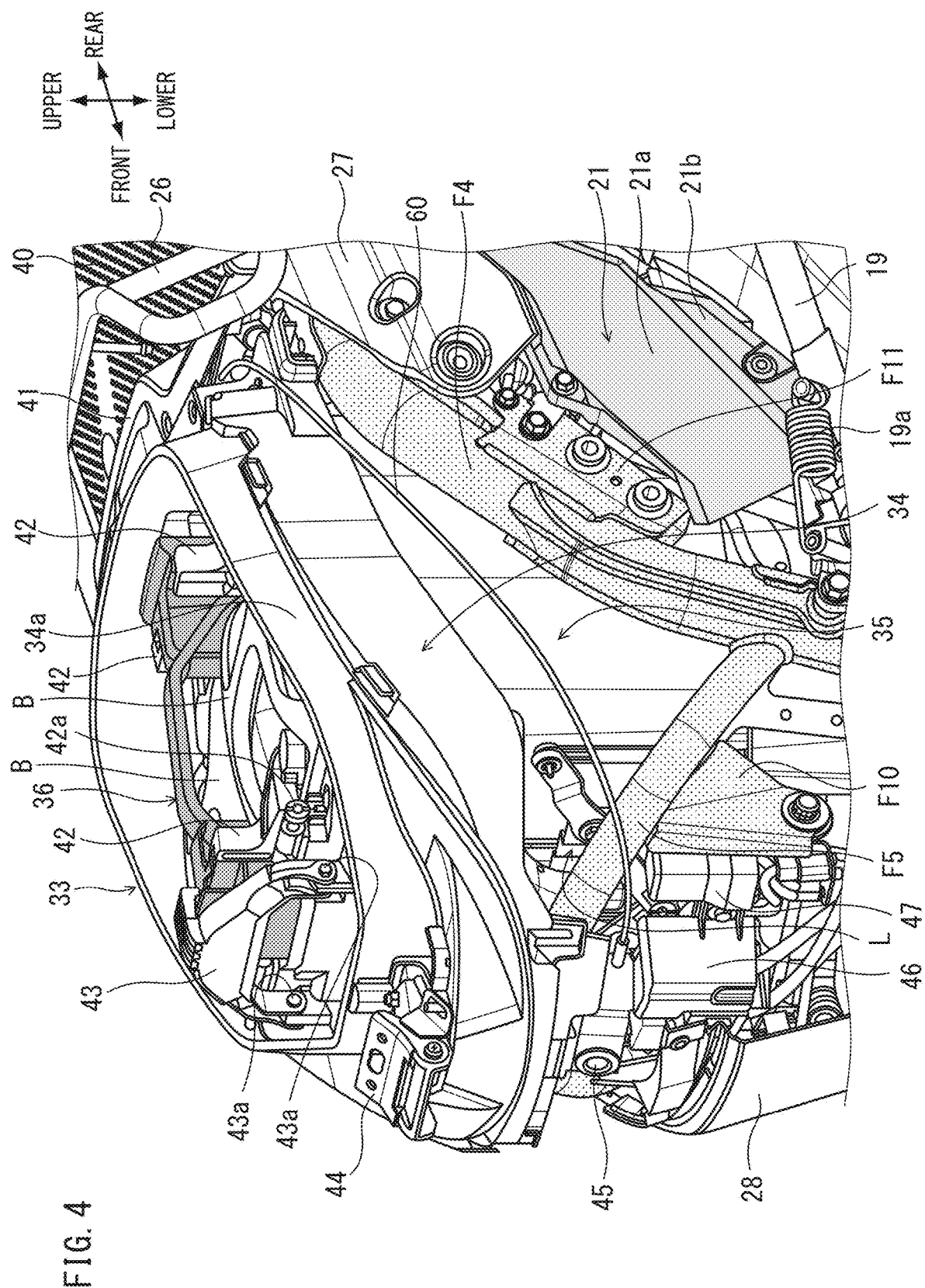
FIG. 4 is an enlarged perspective view for illustrating a peripheral structure of a battery case.
Figure 5:
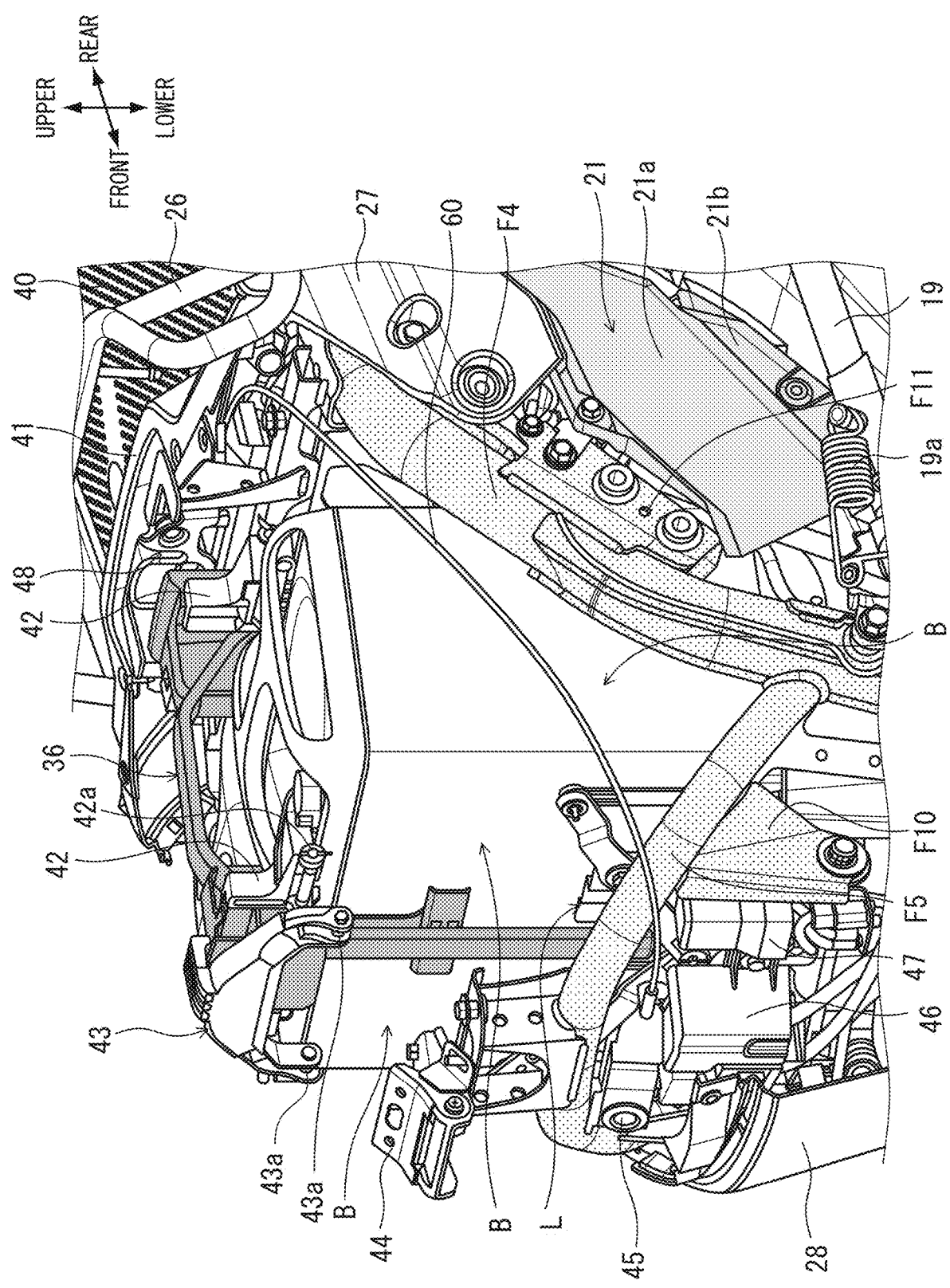
FIG. 5 is an explanatory view of a structure in which the battery case is erased from the state of FIG. 4.

FIG. 4 is an enlarged perspective view for illustrating a peripheral structure of the battery case 33. FIG. 4 illustrates a state where the seat 29 and the seat lower cover 30 are removed and the left half of the floor upper cover 28 is removed. In addition, FIG. 5 is an explanatory view of a structure in which the battery case 33 is erased from the state of FIG. 4.

An operation lever 36, configured to be manually gripped by a worker and moved up and down, is arranged between the two batteries B housed in the battery case 33. In a state where the operation lever 36 is pushed downward and battery-side terminals and case-side terminals are connected to each other, pressing holders 42, pivotally supported to be swingable by swing axes 42a, are brought into contact with the upper surfaces of the batteries B with urging force, and the up and down movement of the batteries B can accordingly be suppressed, even when riding across a large step during traveling.

A locking member 43 for holding the operation lever 36 in a state of being pushed downward is arranged in front of the operation lever 36. The locking member 43 is pivotally supported by the upper-side case 34 through swing axes 43a and is switched to the unlocked state by being tilted forward from the erected state illustrated in the drawing.

A standing wall part 34a constituting an upper edge of the battery case 33 is formed to descend forward along the shape of the bottom surface of the seat 29. Accordingly, when the seat 29 is opened, the locking member 43 positioned near the front and the operation lever 36 can easily be accessed, and the work of pulling out and inserting the batteries B is also facilitated.

The battery case 33 is supported so as to be sandwiched between the left and right rising frames F4. The rising frames F4 are provided with a pair of left and right tandem step holders F11, and the cross pipe F5 curved in an approximately U-shape projecting upward and coupling the left and right rising frames F4 to each other is arranged at a position in front of the lower side of the tandem step holders F11.

Referring to FIG. 5, a pair of front and rear link mechanisms L for converting the up and down movement of the operation lever 36 to the up and down movement of the case-side terminals is arranged in front of and behind the lower-side case 35 of the battery case 33. A key cylinder 45 for actuating a seat catch mechanism 48 arranged at an upper portion of a rear end of the battery case 33 is arranged at a position covered with the seat lower cover 30 below the hinge 44. A rear cover 41 covers above the seat catch mechanism 48, and a cable 60 extending from the key cylinder 45 is connected to the left side of the seat catch mechanism 48 in the vehicle width direction. A contactor 46 for turning on and off electric power supply to the electric components is arranged below the key cylinder 45. The cross pipe F5 has a function of enhancing frame rigidity by coupling the left and right rising frames F4 to each other, enhancing a protection function on the side surface sides of the battery case 33, and protecting the link mechanism L disposed adjacent to the front surface of the battery case 33 and the electric components such as the contactor 46. In addition, a harness for connecting the batteries B and the contactor 46 to each other can be shortened by disposing the contactor 46 at a position near the batteries B.

A pair of left and right plate-like support stays F10 for supporting the front surface side of the battery case 33 below the link mechanisms L is provided on the lower surface of the cross pipe F5 made of a steel pipe. The lateral sides of the electric components positioned below and behind the cross pipe F5 are also protected by the support stays F10.

A front end of the cover member 21 is arranged behind the tandem step holders F11. The cover member 21 is provided with a wide-width part 21a covering from the sides of the battery case 33 up to the rear of the PCU 32 and a narrow-width part 21b coupled to a lower portion of the wide-width part 21a and formed narrower in width than the wide-width part 21a.

Figure 6:
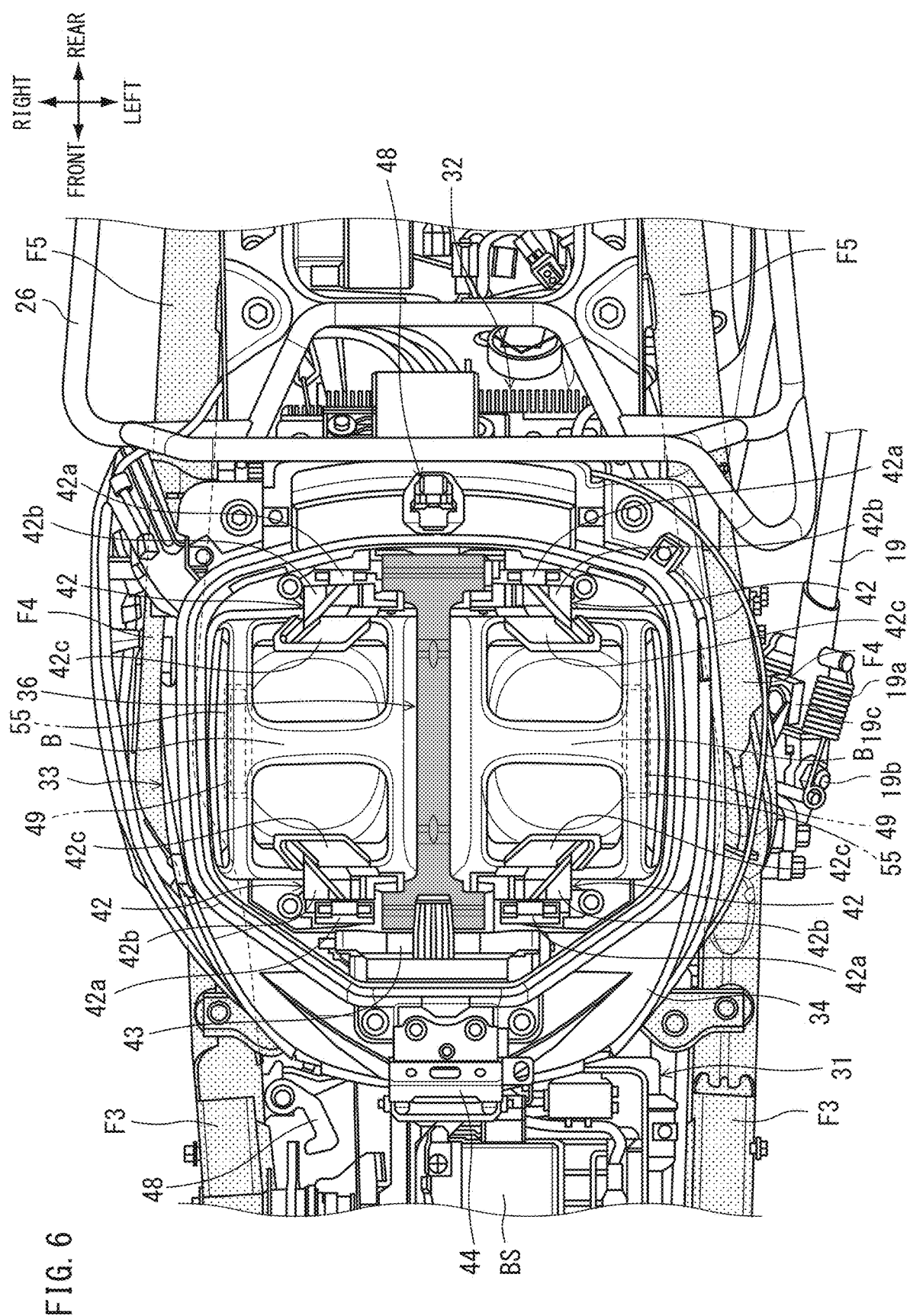
FIG. 6 is a partially enlarged plan view of the electric-powered motorcycle with the exterior parts removed.

FIG. 6 is a partially enlarged plan view of the electric-powered motorcycle 1 with the exterior parts removed. The two batteries B are arranged next to each other on the left and right sides, and the operation lever 36 whose grip part extends in the longitudinal direction is arranged at a position in the middle in the vehicle width direction between the left and right batteries B. The pressing holders 42 that press the upper surfaces of the batteries B are provided while making a front and rear pair for one battery B. Each pressing holder 42 has a metal main body part 42b pivotally supported to be swingable by the swing axis 42a, and a rubber portion 42c covering the distal end side of the main body part 42b. The elastic force of each rubber portion 42c enables to stably hold the housing state of the batteries B.

Urging force on one side is applied by an urging member to the pressing holders 42 pivotally supported to be swingable by the swing axes 42a, and the pressing holders 42 are constituted so as to erect in the vertical direction by being pushed up by the operation lever 36 after pulling up the operation lever 36 while pressing the upper surfaces of the batteries B by the urging force in a state where the operation lever 36 is pushed down.

In the present embodiment, since the pair of front and rear pressing holders 42 is provided for each battery B, when the batteries B are pulled out outward in the vehicle width direction while being lifted upward and brought into contact with the standing wall part 34a of the battery case 33, the batteries B can smoothly be removed without interference by the pressing holders 42. Accordingly, a lifting height required when attaching and detaching the batteries B as heavy objects is reduced, and the batteries B can be attached and detached while being inclined outward in the vehicle width direction, thereby facilitating the attaching/detaching work.

A battery-side terminal 49 provided at a bottom portion of each battery B is arranged on the outer side of each battery B in the vehicle width direction. Accordingly, the operation lever 36 for allowing case-side terminals 55 positioned below the battery-side terminals 49 to move up and down can similarly be operated from either the left or right side of the vehicle body, and thus replacement work of the batteries B is facilitated. In addition, a space for providing the link mechanisms L interlocking the operation lever 36 and the case-side terminals can be secured by arranging the operation lever 36 and the case-side terminals 55 while being apart from each other.

The rising frames F4 coupled to the underframes F3 for supporting the low floor 17 from below have a shape in which a lateral interval is widened according to the shape of the battery case 33 at rising parts from the underframes F3. A pivot 19b of the side stand 19 supported by the rising frame F4 on the left side in the vehicle width direction is provided at a part where the rising frame F4 swells outward in the vehicle width direction. Accordingly, by pivotally supporting the side stand 19 on the outer side of the vehicle body frame F in the vehicle width direction, when the vehicle is stopped using the side stand 19, the ground contact surface is positioned on the outer side in the vehicle width direction to enhance the stability of the vehicle body, and unfolding and storage operations of the side stand 19 are facilitated. Return springs 19a for biasing the side stand 19 to an unfolded state and a stored state are provided outside and inside the side stand 19 while making a pair.

Figure 7:
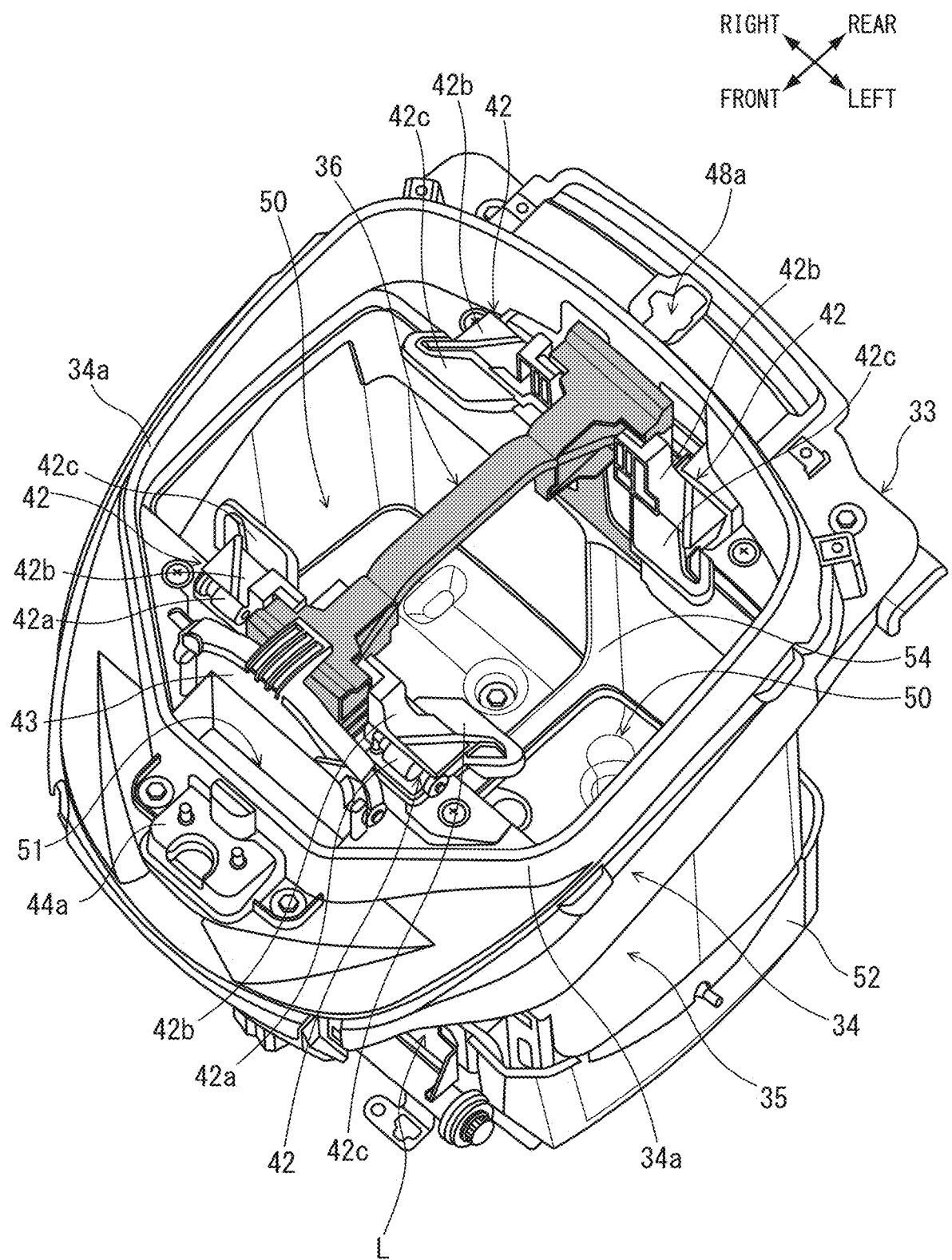
FIG. 7 is a perspective view of the battery case with batteries removed.

FIG. 7 is a perspective view of the battery case 33 with the batteries B removed. In the battery case 33 formed by combining the upper-side case 34 and the lower-side case 35 with each other, housing parts 50 into which the two batteries B disposed close to each other in the vehicle width direction are inserted are formed. The battery case 33 has a bottomed box shape with the upper side open, and the rigidity is enhanced. Accordingly, it is possible to enhance the durability of the battery case 33 in which the batteries B are pressed against the standing wall part 34a of the upper-side case 34 every time the batteries B are attached and detached.

A partition 54 for preventing the left and right batteries B from coming into contact with each other is provided at a bottom portion of the housing parts 50. The partition 54 extends upward up to the height of approximately half the lower-side case 35 along front and rear inner walls of the housing parts 50. According to the partition 54, it is possible to stably hold the batteries B by preventing the two batteries B housed in the battery case 33 from coming into contact with each other on the bottom side. In addition, insertion work of the batteries B is facilitated by allowing the partition 54 to function as a guide when the batteries B are inserted into the battery case 33.

A pedestal 44a to which the hinge 44 is attached is provided at a front end of the upper-side case 34. A deep groove part 51 capable of housing documents and the like is provided between the pedestal 44a and the locking member 43. The deep groove part 51 is provided by using a space generated by inclining the batteries B rearward with respect to the vertical direction.

As described above, the operation lever 36, which is configured to be manually gripped by a worker and moved up and down, is arranged between the left and right batteries B. When the operation lever 36 is pulled up upward, the batteries B can be detached from the battery case 33. On the other hand, when the operation lever 36 is pushed down, battery-side terminals 49 and case-side terminals 55 are electrically connected to each other and the batteries B are held at predetermined positions.

The pressing holders 42 that press the upper surfaces of the batteries B are provided while making a front and rear pair for each of the left and right housing parts 50. Each battery B is formed in an approximately rectangular parallelepiped shape that is long in the up-and-down direction of the vehicle body, and the surfaces directed outward in the vehicle width direction among six surfaces constituting each battery B are formed in a curved shape projecting outward in the vehicle width direction in a vehicle body plan view. Accordingly, while maximizing the battery capacity, the insertion work can be facilitated by easily grasping the insertion direction of the batteries B. In addition, since the surface brought into contact with an upper end of the standing wall part 34a of the battery case 33 when each battery B is attached and detached is curved, frictional resistance when the weight of each battery B is put on the upper end of the standing wall part 34a of the battery case 33 is small, and smooth attaching/detaching work can be performed.

Further, when the batteries B are housed in the battery case 33, the outer surfaces of the batteries B in the vehicle width direction and the standing wall part 34a of the battery case 33 are disposed close to each other in a vehicle body plan view. Accordingly, when the batteries B are pulled out outward in the vehicle width direction while being lifted upward and when the batteries B are housed in the battery case 33, the outer surfaces of the batteries B in the vehicle width direction can easily be brought into contact with the standing wall part 34a of the battery case 33. Accordingly, the attaching/detaching work can be performed while putting the weight of the batteries B on the standing wall part 34a without completely lifting the batteries B, and thus the workload is reduced. As illustrated in FIG. 4, since the standing wall part 34a is formed to descend forward in a vehicle body side view, when the batteries B are pulled out outward in the vehicle width direction while being lifted upward and when the batteries B are housed in the battery case 33, the batteries B can easily be inclined diagonally forward on the outsides in the vehicle width direction, and the attaching/detaching work of the batteries B is facilitated.

Figure 8:
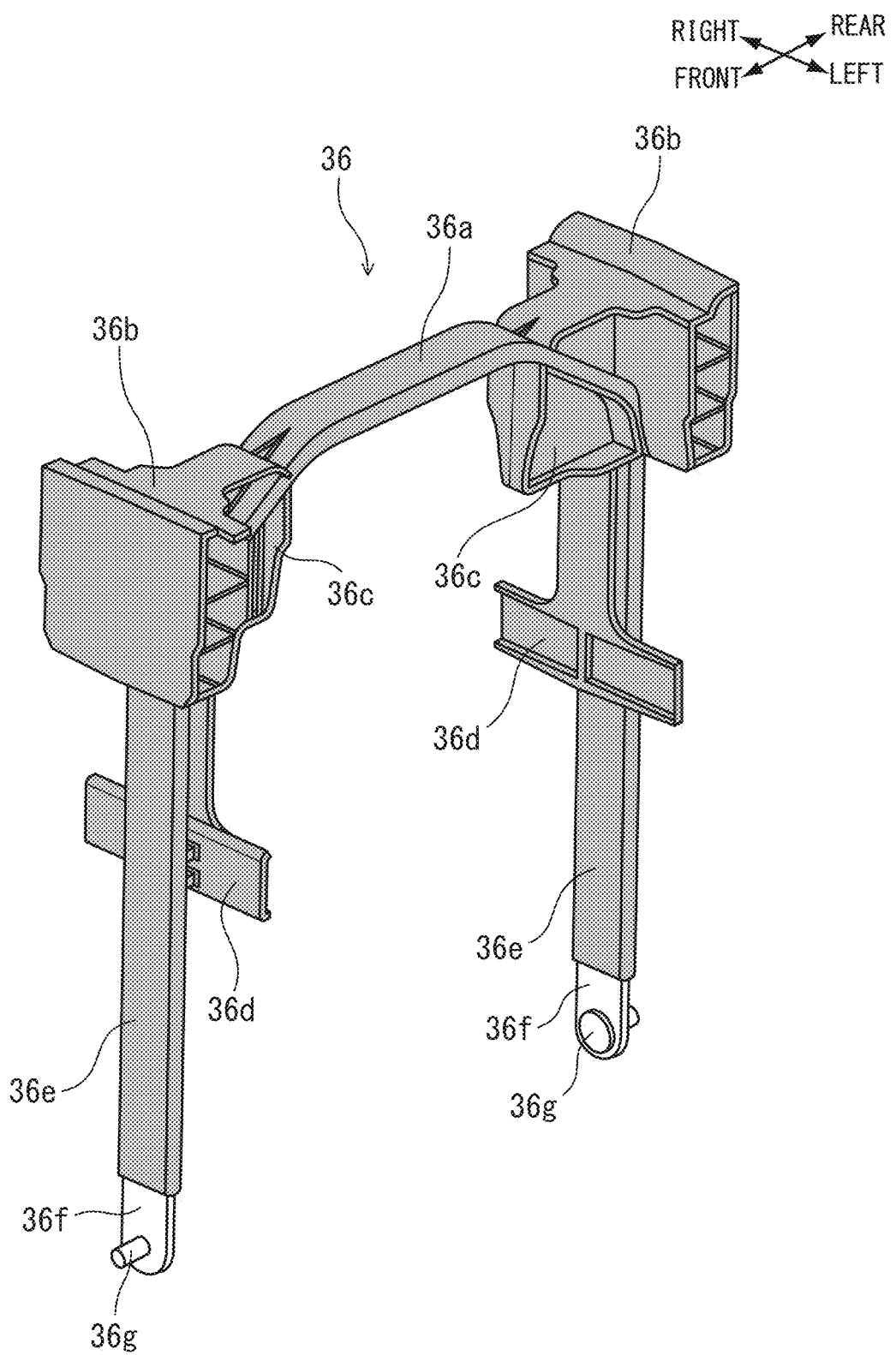
FIG. 8 is a perspective view of an operation lever.

FIG. 8 is a perspective view of the operation lever 36. The operation lever 36 made of synthetic resin or the like has a longitudinally and bilaterally symmetrical shape. A grip part 36a for moving the operation lever 36 up and down and coupling rods 36e extending downward to actuate the link mechanisms L are coupled to each other by coupling blocks 36b having a hollow structure. The locking member 43 is engaged with the upper surface of the coupling block 36b on the front side to restrict upward movement of the operation lever 36.

Rectangular engagement plates 36d are provided approximately in the middles of the coupling rods 36e in the up-and-down direction such that when the operation lever 36 is pulled up, the engagement plates 36d are brought into contact with the lower surfaces of the pressing holders 42 to allow the pressing holders 42 to erect in the vertical direction. In addition, metal stays 36f for supporting pins (first axes) 36g connected to the link mechanisms L are fixed to lower ends of the coupling rods 36e by insert molding.

A pair of front and rear separator parts 36c inserted between the left and right batteries B when the operation lever 36 is pushed down is provided at positions inside the coupling blocks 36b between the grip part 36a and the coupling rods 36e. Accordingly, the operation lever 36 can also function as a partition plate for stably holding the two batteries B at predetermined positions while preventing the two batteries B disposed close to each other from coming into contact with each other.

Figure 9:
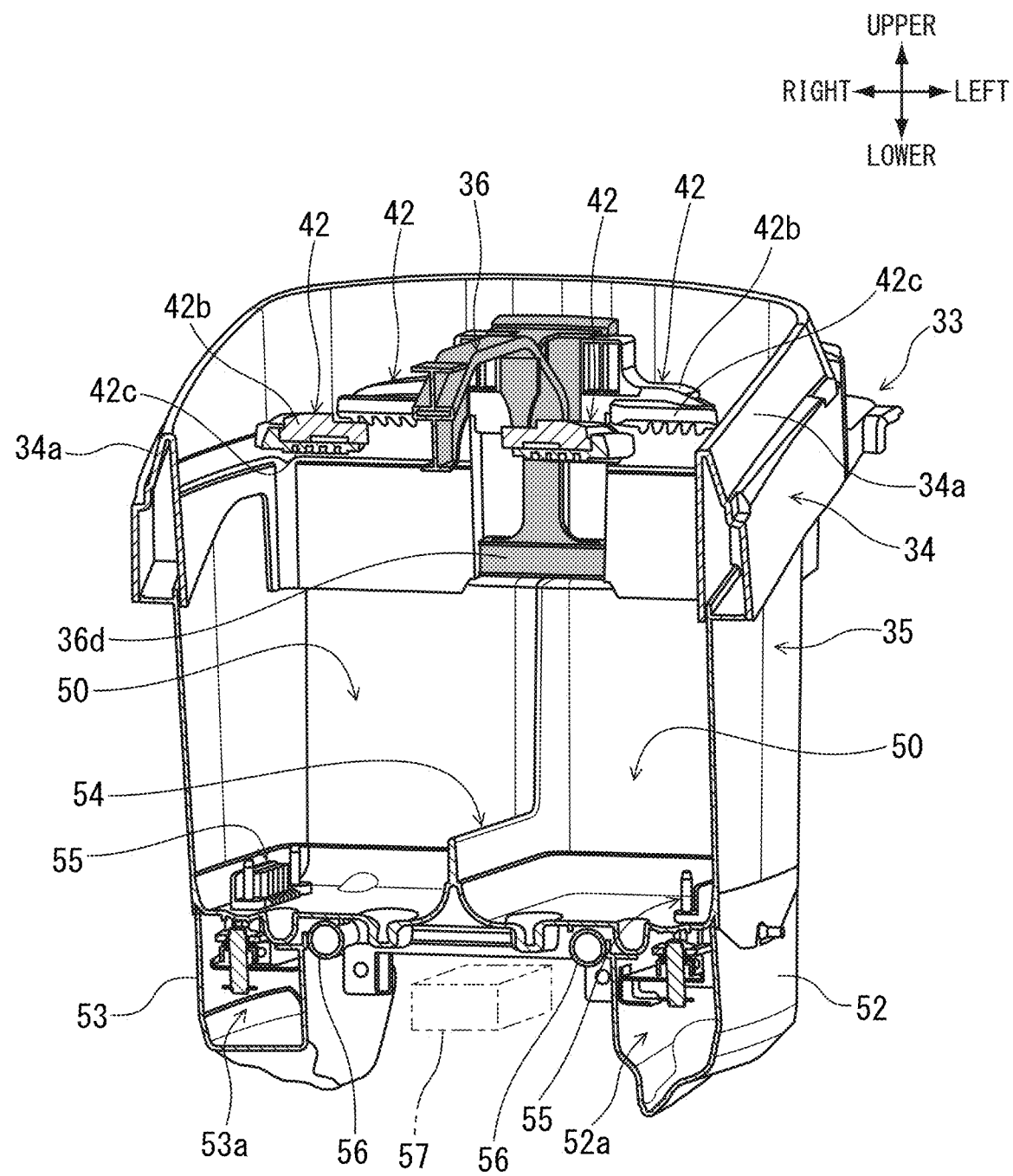
FIG. 9 is a cross-sectional perspective view for illustrating a state where the battery case is cut in a longitudinal direction.
Figure 10:
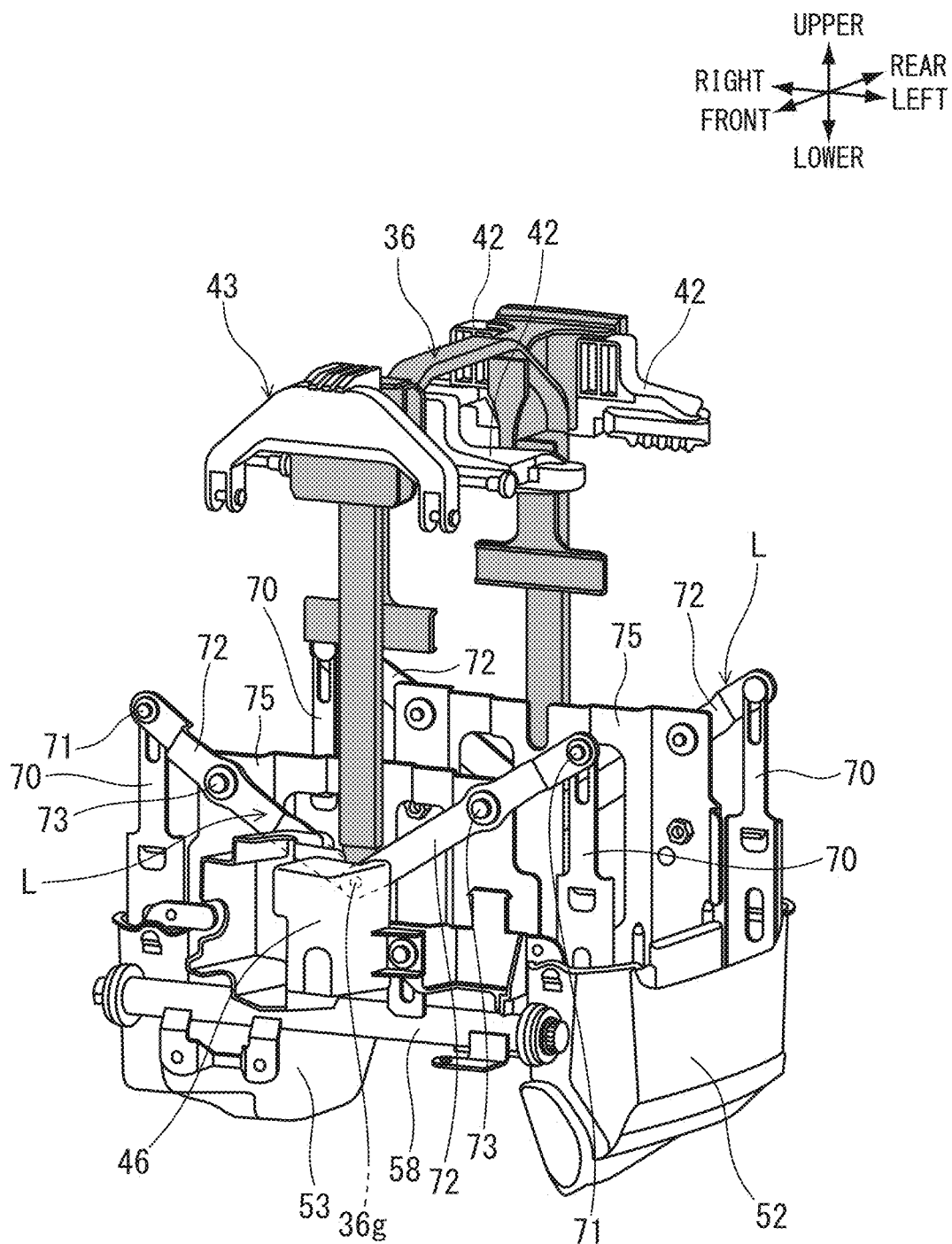
FIG. 10 is a perspective view for illustrating a configuration of link mechanisms.

FIG. 9 is a cross-sectional perspective view for illustrating a state where the battery case 33 is cut in the longitudinal direction. In addition, FIG. 10 is a perspective view for illustrating a configuration of the link mechanisms L. As described above, the standing wall part 34a of the upper-side case 34 forming an opening of an upper portion of the battery case 33 is shaped to descend forward in a vehicle body side view. Accordingly, the operation lever and the pressing holders 42 are protected by the standing wall part 34a on the rear side, and the operation lever 36 and the locking member 43 can easily be accessed from the outside in the vehicle width direction on the front side.

The coupling rods 36e of the operation lever 36 are guided outside the lower-side case 35 through an opening provided in the lower-side case 35 and are connected to the pair of front and rear link mechanisms L, respectively, arranged in front of and behind the lower-side case 35. The partition 54 continued from a bottom portion of the housing parts 50 extends up to lower portions of the engagement plates 36d when the operation lever 36 is pushed down up to a predetermined position.

A left-side terminal cover 52 and a right-side terminal cover 53 that house the case-side terminals 55 moving up and down according to the operation of the link mechanisms L are attached to lower portions of the lower-side case 35. In addition, a pair of left and right support pipes 56 for supporting the battery case 33 from below is arranged at lower portions of the lower-side case 35 between the left-side terminal cover 52 and the right-side terminal cover 53.

The left and right case-side terminals 55 are arranged according to the positions of the battery-side terminals 49 arranged on the outer sides in the vehicle width direction, and the case-side terminals 55 project upward from bottom portions of the lower-side case 35 by pushing down the operation lever 36 to be connected to the battery-side terminals 49 while move below the bottom portions of the lower-side case 35 by pulling up the operation lever 36. In this manner, the case-side terminals 55 are arranged while projecting below the bottom portions of the battery case 33, so that the vertical dimension of the battery case 33 can be reduced.

In addition, the left-side terminal cover 52 and the right-side terminal cover 53 forming housing spaces 52a and 53a of the case-side terminals 55 are arranged apart from each other in the vehicle width direction. Accordingly, the battery-side terminals 49 and the case-side terminals 55 are arranged apart from each other, the operation lever 36 is arranged in the middle in the vehicle width direction to enable a similar operation from either the left or right side of the vehicle body, and spaces where the link mechanisms L for interlocking the operation lever 36 and the case-side terminals 55 are arranged can be secured.

In the present embodiment, a space secured between the left-side terminal cover 52 and the right-side terminal cover 53 is used to arrange a down regulator 57. In other words, the down regulator 57 is arranged between the left and right case-side terminals 55 below the lower-side case 35. Accordingly, the layout efficiency can be enhanced, and a harness connected to the down regulator 57 can be shortened. Further, a space between the left-side terminal cover 52 and the right-side terminal cover 53 serves as a passage for a traveling wind passing inside the undercovers 14, and thus the down regulator 57 can efficiently be cooled.

Referring to FIG. 10, the pair of front and rear link mechanisms L is arranged on the front and rear surfaces of the battery case 33. Accordingly, it is possible to stably move the case-side terminals 55 up and down. In addition, by arranging the link mechanisms L in front of and behind the battery case 33, the dimension around the battery case 33 in the vehicle width direction can be reduced, and the link mechanisms L can be protected even when external force is applied from the side of the vehicle body. In addition, the link mechanisms L have a bilaterally symmetrical structure with the middle in the vehicle width direction as the center, synchronize the operations of the left and right case-side terminals 55, and can excellently move the terminals up and down by one operation lever.

The link mechanisms L have a configuration in which terminal support arms 70 for supporting the case-side terminals 55 are moved up and down by arm members 72 coupled to lower ends of the operation lever 36. The arm members 72 are pivotally supported to be swingable by base plates 75 through third axes 73 that function as fulcrums. Ends of the arm members 72 on the central side in the vehicle width direction are supported by the operation lever 36 through the first axes 36g that function as force points. On the other hand, ends of the arm members 72 on the outsides in the vehicle width direction are supported by the terminal support arms 70 through second axes 71 that function as working points. In the present embodiment, the third axis 73 is provided nearer the second axis 71 than the middle of each arm member 72 to increase the lever ratio of the link mechanisms L, and the operation load of the operation lever 36 is reduced. A support pipe 58 fixed to the support stays F10 provided on the lower surface of the cross pipe F5 is arranged in front of the left-side terminal cover 52 and the right-side terminal cover 53.

Figure 11:
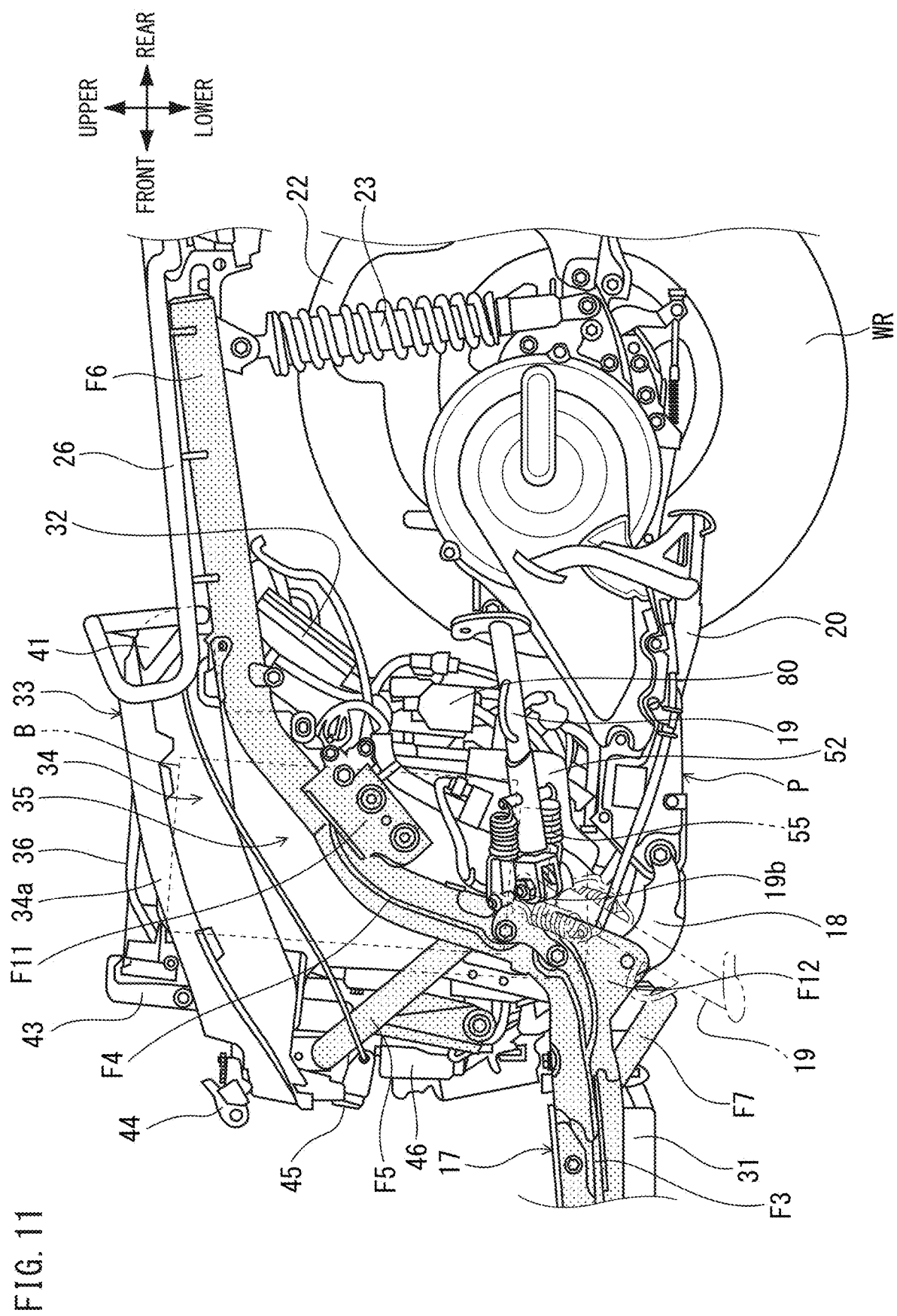
FIG. 11 is a partially enlarged view of FIG. 3.

FIG. 11 is a partially enlarged view of FIG. 3. A support plate F12 for swingably supporting the power unit P to the vehicle body frame through the link lever 18 is provided at a lower portion of a rear end of the underframe F3 at a position below the pivot 19b of the side stand 19.

As described above, the batteries B are housed while being inclined rearward with respect to the battery case 33, and the standing wall part 34a forming an upper edge of the battery case 33 has a shape inclined to descend forward. At this time, when the batteries B are pulled out upward to some extent, the batteries B can be inclined diagonally forward on the outsides in the vehicle width direction while allowing the batteries B to be brought into contact with the upper edge of the standing wall part 34a, and the batteries B can be removed without being lifted completely while keeping the upright states of the batteries B, thus reducing the workload. In contrast, in the case of inserting the batteries B, if the batteries B are lifted up to a position where the side surfaces of the batteries B are brought into contact with the upper edge of the standing wall part 34a, the weight of the batteries B can be put on the standing wall part 34a, and the insertion operation can be continued, thus reducing the workload.

As described above, the pivot 19b of the side stand 19 is arranged at a position where the rising frame F4 swells outward in the vehicle width direction. This position is a position falling within the longitudinal length of the batteries B in a vehicle body side view. Accordingly, the load applied to the pivot 19b can be reduced by arranging the side stand 19 in the vicinity of the batteries B as heavy objects.

In addition, the pivot 19b is provided at a position near the lower side of the rising frame F4. Accordingly, the stability when the vehicle is stopped is enhanced by the side stand 19 supported at the position outside the battery case 33 in the vehicle width direction, and the total length of the side stand 19 can be suppressed by supporting the side stand 19 at the position near the lower side of the rising frame F4.

Further, the pivot 19b is arranged at the same height as the low floor 17, and, when the side stand 19 is stored, the orientation of the side stand 19 is in line with the orientation of the upper surface of the low floor 17. Accordingly, the stored side stand 19 is positioned at the same height as the low floor 17, and thus unfolding and storage operations while riding are facilitated. In addition, since the pivot 19b is provided at a position overlapping the case-side terminals 55 in a vehicle body side view, the pivot 19b and the rising frame F4 to which the pivot 19b is fixed can protect the case-side terminals 55 even when external force is applied from the outside in the vehicle width direction.

The PCU 32 as a heavy object is disposed close to a rear upper portion of the battery case 33, and a junction box 80 to which plural high-voltage harnesses are connected is arranged below the PCU 32. The down regulator 57 is disposed close to a lower portion of the battery case 33, the pair of front and rear link mechanisms L (see FIG. 10) is arranged in front of and behind the battery case 33, and further the contactor 46 is arranged in front of the link mechanism L on the front side. In this manner, the stability when the vehicle is stopped can be enhanced by concentratedly disposing the plural electric components around the battery case 33, in other words, around the pivot 19b of the side stand 19. In addition, since no electric components are disposed on the sides of the battery case 33, the swelling amounts of the rising frames F4 toward the outsides in the vehicle width direction are suppressed, and an increase in dimension in the vehicle width direction is prevented.

Figure 12:
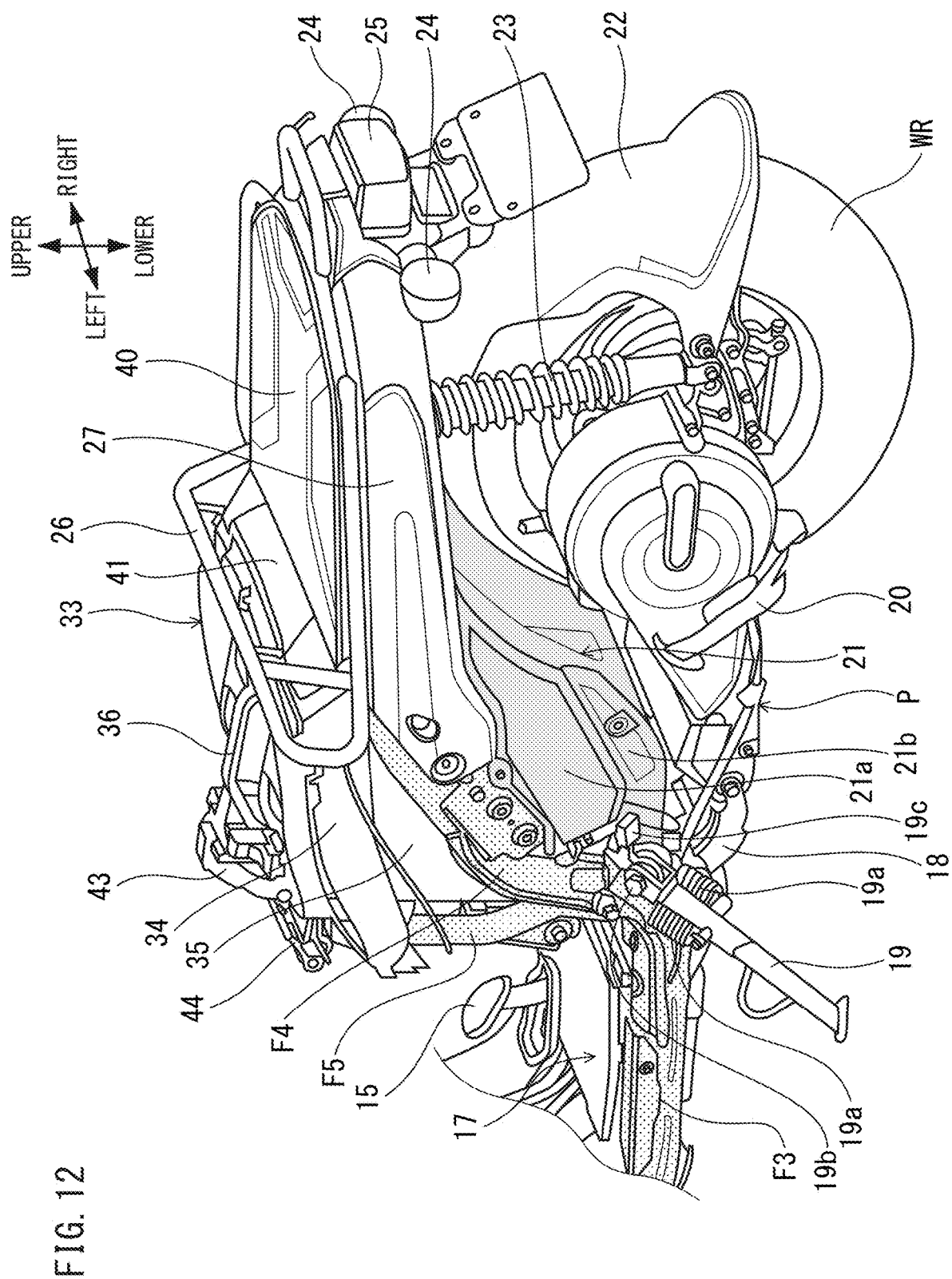
FIG. 12 is a partially enlarged perspective view of the electric-powered motorcycle viewed from a left rear.

FIG. 12 is a partially enlarged perspective view of the electric-powered motorcycle 1 viewed from the left rear. By providing the pivot 19b at a position near the lower side of the rising frame F4, the side stand 19 can support the vehicle body on the side of the battery case 33 having a heavy weight while suppressing the total length of the stand bar part. Accordingly, even when baggage having a heavy weight is loaded on the rear carrier 40, the vehicle can stably be stopped by the side stand 19. A stopper 19d for regulating the storage position of the side stand 19 is provided behind the pivot 19b.

As described above, the cover member 21 covering a rear lower portion of the battery case 33 is provided with the wide-width part 21a positioned above the stored side stand 19 and the narrow-width part 21b coupled to a lower portion of the wide-width part 21a and having a dimension smaller than the wide-width part 21a in the vehicle width direction. Accordingly, by providing the narrow-width part 21b for widening the interval between the cover member 21 and the side stand 19 in the range where the side stand 19 swings, the possibility that a foot comes into contact with the cover member 21 when operating the side stand 19 is reduced, and the operability of the side stand 19 can be enhanced.

Figure 13:
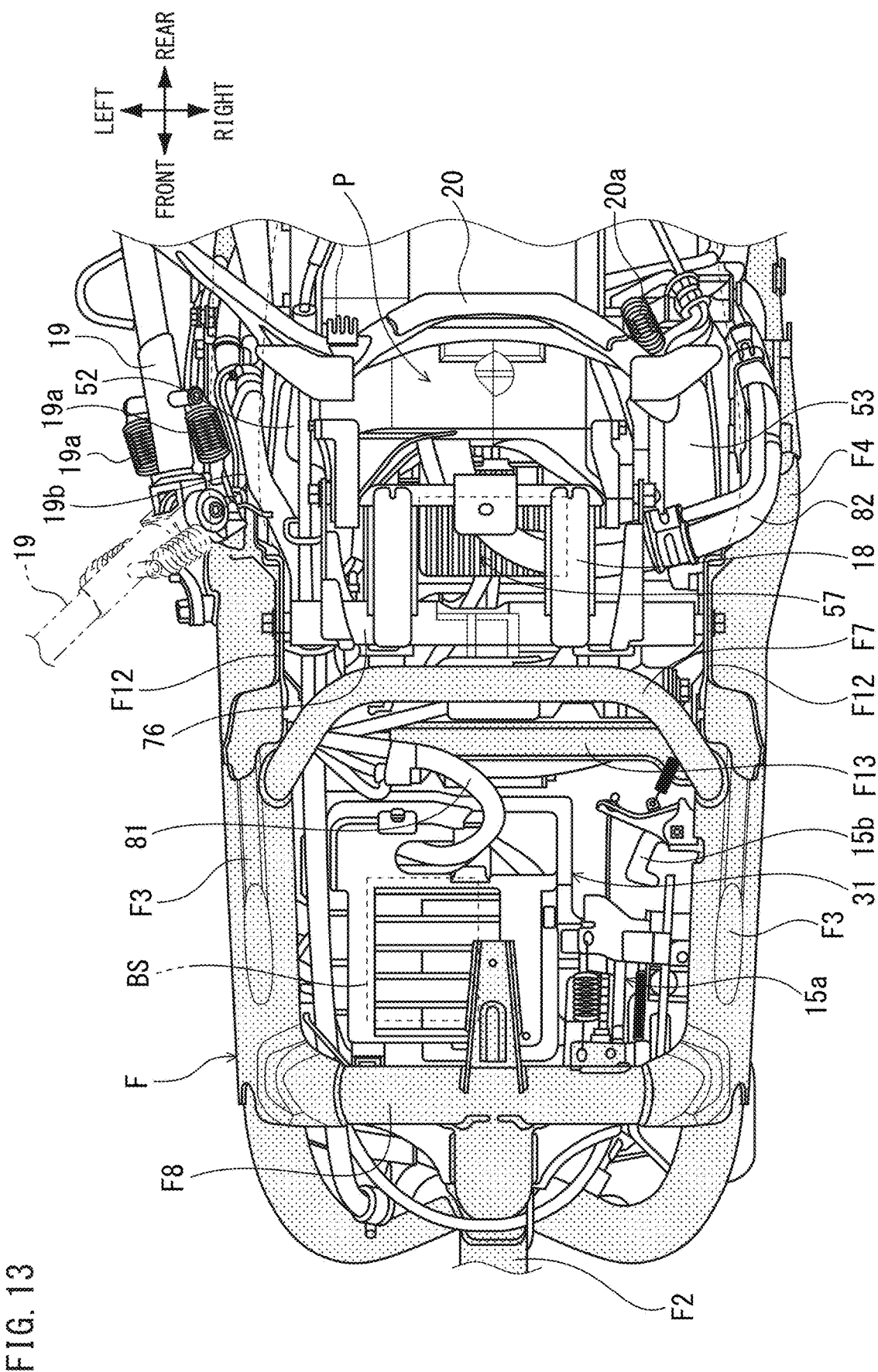
FIG. 13 is a bottom view of the electric-powered motorcycle with the exterior parts removed.

FIG. 13 is a bottom view of the electric-powered motorcycle 1 with the exterior parts removed. The housing case 31 sandwiched between the underframes F3 and housing the sub-battery BS is disposed while being offset to the left side in the vehicle width direction, and an interlocking mechanism 15a for actuating the front and rear brakes according to an operation of the brake pedal 15 is arranged on the right side of the housing case 31 in the vehicle width direction. A harness 81 continued to the sub-battery BS, a fuse box, and the like projects from a bottom portion of the housing case 31 and is guided rearward. A lock lever 15b for holding the brake pedal 15 in an actuated state is arranged behind the interlocking mechanism 15a. A rail member F13 for supporting the low floor 17 from below is arranged behind the housing case 31.

The link lever 18 supported between the power unit P and the support plates F12 is arranged at a position overlapping the down regulator 57 provided below the battery case 33 in a vehicle body bottom view. The down regulator 57 enhances a cooling effect by a traveling wind by arranging a cooling fin toward the lower side of the vehicle body. The link lever 18 is pivotally supported to be swingable by the support plates F12 through a shaft passing through a pivot pipe 76 provided at a front end of the link lever 18. Each of the left-side terminal cover 52 and the right-side terminal cover 53, which are attached to lower portions of the battery case 33, has a bilaterally asymmetrical shape to prevent interference with the link lever 18 and a high-voltage three-phase harness 82. A return spring 20a of the center stand 20 is supported by the power unit P at a position near the right side in the vehicle width direction.

Figure 14:
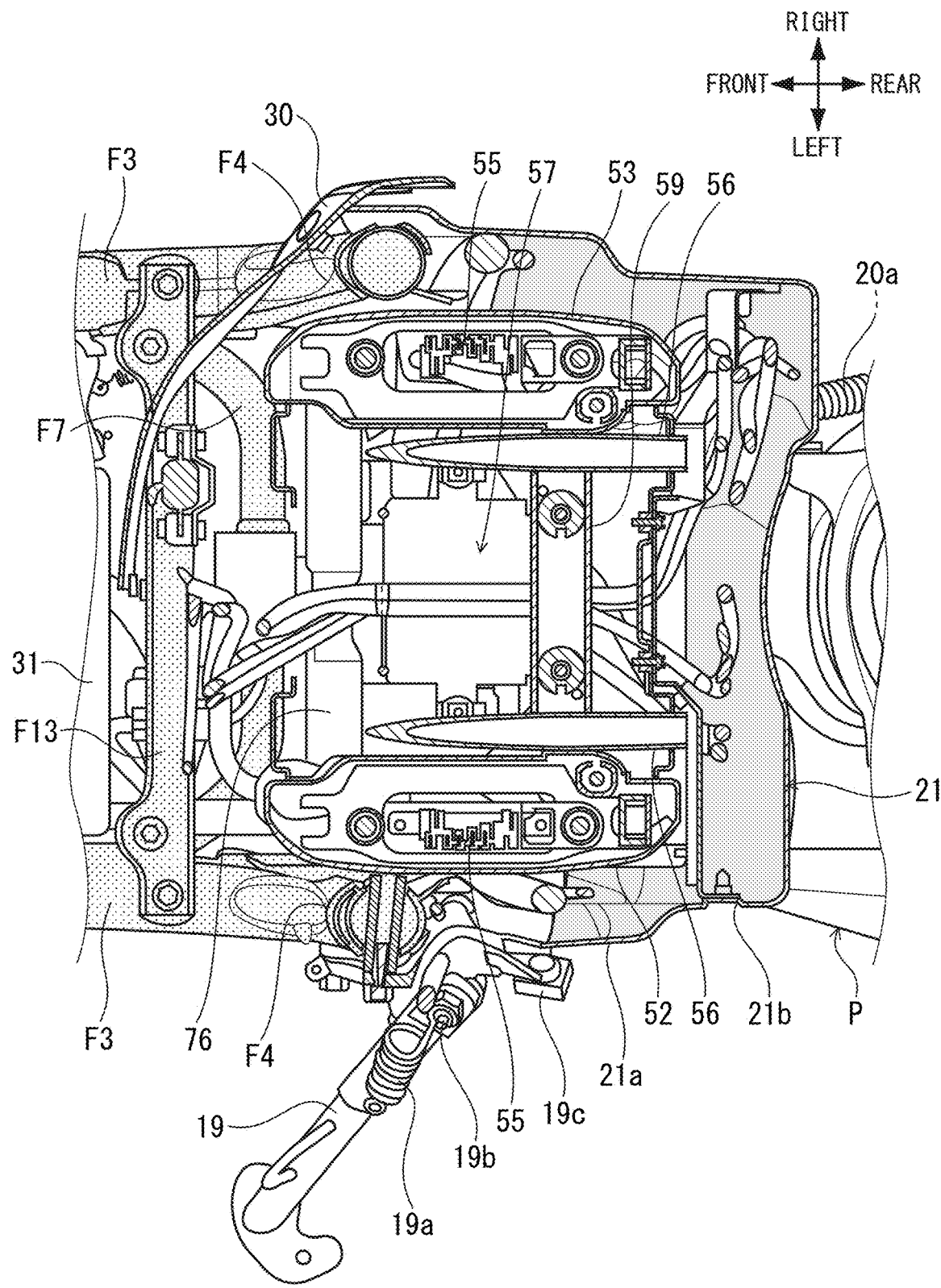
FIG. 14 is a cross-sectional view for illustrating a state obtained by cutting with an approximately horizontal plane so as to pass through case-side terminals.

FIG. 14 is a cross-sectional view for illustrating a state obtained by cutting with an approximately horizontal plane so as to pass through the case-side terminals 55. The pivot 19b of the side stand 19 is arranged at a position where the rising frame F4 swells outward in the vehicle width direction and at a position approximately in the middle of the case-side terminal 55 in the longitudinal direction, reduces the load on the side stand 19, and enables the vehicle to be stopped stably.

The cover member 21 covering from the rear of the sides of the battery case 33 up to the rear of the PCU 32 enhances the convenience of the side stand 19 by providing the narrow-width part 21b, and the inside of the wide-width part 21a is utilized as a harness routing space. In addition, the case-side terminals 55 are separated from each other on the outer sides in the vehicle width direction and are projected below the battery case 33. Thus, a space is secured at a lower portion of the battery case 33 near the middle in the vehicle width direction, and the support pipes 56 for supporting the battery case 33 from below, a coupling pipe 59, and the down regulator 57 are arranged by using the space, so that the vehicle body can be downsized.

Note that the form of the electric-powered motorcycle, the shape and structure of the vehicle body frame, the shapes and structures of the batteries and the battery case, the shapes and structures of the operation lever and the pressing holders, the shapes and structures of the link mechanisms, the shape and structure of the side stand, and the like are not limited to the above-described embodiment and can variously be changed. The various structures according to the present invention can be applied to a straddle-type tricycle, quadricycle, and the like.

REFERENCE SIGNS LIST

1: Electric-powered motorcycle (straddle-type electric vehicle)
2: Steering handlebar
17: Low floor
19: Side stand
19b: Pivot of side stand
29: Seat
32: PCU
33: Battery case
34a: Standing wall part
36: Operation lever
36c: Separator part
40: Rear carrier
42: Pressing holder
42c: Rubber portion
46: Contactor
47: Connector
49: Battery-side terminal
51: Deep groove part
54: Partition
55: Case-side terminal
57: Down regulator
80: Junction box
36g: First axis
71: Second axis
72: Link arm (arm member)
73: Third axis
B: Battery
F3: Underframe
F4: Rising frame
F5: Cross pipe
L: Link mechanism

The invention claimed is:

1. A straddle ride electric vehicle configured by including two approximately rectangular parallelepiped batteries, a battery case in which the batteries are housed, battery-side terminals provided on bottom surfaces of the batteries, and case-side terminals configured to be selectively engaged with the battery-side terminals, wherein:
    the two batteries are arranged next to each other in a vehicle width direction,
    an operation lever for selectively moving the case-side terminals up or down to connect or separate the battery-side terminals and the case-side terminals to/from each other is provided, the operation lever comprising a longitudinally extending grip part and two substantially vertically oriented coupling rods extending downwardly from opposite ends of the grip part,
    the operation lever is arranged at a position in a middle in the vehicle width direction between the two batteries, and
    the battery-side terminals and the case-side terminals are positioned proximate outer sides of the battery case in the vehicle width direction.

2. The straddle ride electric vehicle according to claim 1, wherein:
    the battery case includes an upper case portion and a lower case portion;
    a pair of front and rear link mechanisms, for coupling the operation lever and the case side terminals to each other, is provided in front of and behind the lower case portion of the battery case, with the front link mechanism provided in front of the lower case portion of the battery case, and the rear link mechanism provided behind the lower case portion of the battery case,
    wherein the link mechanisms are configured such that upward movement of the operation lever causes downward movement of the case side terminals.

3. The straddle ride electric vehicle according to claim 2, wherein the link mechanisms have a bilaterally symmetrical structure centered on the middle in the vehicle width direction as a center.

4. The straddle ride electric vehicle according to claim 2, wherein
    the link mechanisms include arm members for connecting first axes, that are connected to the operation lever to act as force points, to second axes that function as working points connected to the case-side terminals, and
    each of third axes, provided at each of the arm members to act as a fulcrum, is provided nearer the second axis than a middle of each arm member.

5. The straddle ride electric vehicle according to claim 2, wherein
    The straddle ride electric vehicle is a scooter vehicle having a low floor between a steering handlebar and a seat,
    the battery case is arranged between a pair of left and right rising frames coupled to rear ends of underframes for supporting the low floor from below, and
    a cross pipe that is formed in a curved shape projecting toward an upper side of a vehicle body to couple the pair of left and right rising frames to each other is arranged in front of the link mechanisms.

6. The straddle ride electric vehicle according to claim 5, wherein
    a contactor for turning on and off electric power supply to electric components is provided, and
    the contactor is arranged in front of the battery case and behind the cross pipe.

7. The straddle ride electric vehicle according to claim 1, wherein:
    a pair of front and rear separator parts are operatively attached to the operation lever, and
    when the operation lever is pushed down to a position where the battery-side terminals and the case-side terminals are connected to each other, the separator parts are accommodated between the two batteries at positions proximate front and rear ends of the batteries, respectively.

8. The straddle ride electric vehicle according to claim 1, wherein the case-side terminals are arranged while projecting below bottom portions of the battery case.

9. The straddle ride electric vehicle according to claim 8, wherein a down regulator is arranged between the left and right case-side terminals below a bottom portion of the battery case.

10. The straddle ride electric vehicle according to claim 1, wherein
    each battery is formed in an approximately rectangular parallelepiped shape that is long in an up-and-down direction of the vehicle body, and
    surfaces directed outward in the vehicle width direction among six surfaces constituting each battery are formed in a curved shape projecting outward in the vehicle width direction in a vehicle body plan view.

11. The straddle ride electric vehicle according to claim 3, wherein
    the link mechanisms include arm members for connecting first axes that are connected to the operation lever to act as force points to second axes that function as working points connected to the case-side terminals, and
    each of third axes that is provided at each of the arm members to act as a fulcrum is provided nearer the second axis than a middle of each arm member.

12. The straddle ride electric vehicle according to claim 3, wherein
    the straddle ride electric vehicle is a scooter vehicle having a low floor between a steering handlebar and a seat,
    the battery case is arranged between a pair of left and right rising frames coupled to rear ends of underframes for supporting the low floor from below, and
    a cross pipe that is formed in a curved shape projecting toward an upper side of a vehicle body to couple the pair of left and right rising frames to each other is arranged in front of the link mechanisms.

13. The straddle ride electric vehicle according to claim 12, wherein
    a contactor for turning on and off electric power supply to electric components is provided, and
    the contactor is arranged in front of the battery case and behind the cross pipe.

14. The straddle ride electric vehicle according to claim 2, wherein
    a pair of front and rear separator parts are operatively attached to the operation lever, and
    when the operation lever is pushed down to a position where the battery-side terminals and the case-side terminals are connected to each other, the separator parts are accommodated between the two batteries at positions proximate front and rear ends of the batteries, respectively.

15. The straddle ride electric vehicle according to claim 2, wherein
a partition positioned between the two batteries is provided at a position proximate a bottom portion of the battery case.

16. The straddle ride electric vehicle according to claim 2, wherein the case-side terminals are arranged while projecting below bottom portions of the battery case.

17. The straddle ride electric vehicle according to claim 16, wherein a down regulator is arranged between the left and right case-side terminals below a bottom portion of the battery case.

18. The straddle ride electric vehicle according to claim 2, wherein
each battery is formed in an approximately rectangular parallelepiped shape that is long in an up-and-down direction of the vehicle body, and
surfaces directed outward in the vehicle width direction among six surfaces constituting each battery are formed in a curved shape projecting outward in the vehicle width direction in a vehicle body plan view.

19. An electric-powered vehicle configured by including two approximately rectangular parallelepiped batteries, a battery case in which the batteries are housed, battery-side terminals provided on bottom surfaces of the batteries, and case-side terminals configured to be selectively engaged with the battery-side terminals, wherein:
the two batteries are arranged next to each other in a vehicle width direction,
an operation lever for selectively moving the case-side terminals up or down to connect or separate the battery-side terminals and the case-side terminals to/from each other is provided, the operation lever comprising a longitudinally extending grip part and two substantially vertically oriented coupling rods extending downwardly from opposite ends of the grip part,
the operation lever is arranged at a position in a middle in the vehicle width direction between the two batteries, and
the battery-side terminals and the case-side terminals are positioned proximate outer sides in the vehicle width direction.

20. The straddle ride electric vehicle according to claim 2, wherein each of the link mechanisms comprises a pair of vertically oriented terminal support arms, each of which supports one of the case side terminals, a pair of intermediate arms pivotally connected to and interconnecting a lower end of one of the coupling rods and upper ends of the terminal support arms, respectively, wherein a medial portion of each of the intermediate arms is pivotally connected to a support member, whereby upward movement of the operation lever causes downward movement of the case side terminals.

* * * * *